United States Patent
Chedru

(10) Patent No.: US 8,069,330 B2
(45) Date of Patent: Nov. 29, 2011

(54) MEMORY MANAGEMENT SYSTEM FOR REDUCING MEMORY FRAGMENTATION

(75) Inventor: Olivier Chedru, Paris (FR)

(73) Assignee: Infovista SA, Les Ulis (FR)

( * ) Notice: Subject to any disclaimer, the term of this patent is extended or adjusted under 35 U.S.C. 154(b) by 459 days.

(21) Appl. No.: 12/295,055

(22) PCT Filed: Mar. 23, 2007

(86) PCT No.: PCT/FR2007/000491
§ 371 (c)(1),
(2), (4) Date: Sep. 29, 2008

(87) PCT Pub. No.: WO2007/118955
PCT Pub. Date: Oct. 25, 2007

(65) Prior Publication Data
US 2009/0276602 A1 Nov. 5, 2009

(30) Foreign Application Priority Data
Mar. 31, 2006 (FR) .................... 06 02849

(51) Int. Cl.
*G06F 13/00* (2006.01)
*G06F 13/28* (2006.01)
*G06F 9/00* (2006.01)
(52) U.S. Cl. .................. 711/170; 711/E12.002; 713/1
(58) Field of Classification Search .................. 711/170, 711/E12.002; 713/1
See application file for complete search history.

(56) References Cited

U.S. PATENT DOCUMENTS

| 6,182,089 | B1 | 1/2001 | Ganapathy et al. |
| 6,804,761 | B1 | 10/2004 | Chen et al. |
| 2002/0069338 | A1 | 6/2002 | Ozdemir et al. |
| 2005/0005083 | A1* | 1/2005 | Ozdemir et al. ............... 711/170 |
| 2007/0233989 | A1* | 10/2007 | Garcia-Arellano et al. .. 711/170 |
| 2008/0162863 | A1* | 7/2008 | McClure et al. ............... 711/171 |

OTHER PUBLICATIONS

"Using de Bruijn Sequences to Index a 1 in a Computer Word", Charles E. Leiserson et al.; MIT Laboratory for Computer Science, {cel,prokop,randall}@lcs.mit.edu, Jul. 7, 1998, pp. 1-8.

* cited by examiner

*Primary Examiner* — Edward Dudek, Jr.
(74) *Attorney, Agent, or Firm* — Greer, Burns & Cain, Ltd.

(57) ABSTRACT

A memory management system for a process formulated in the C/C++ language in a processing unit includes an allocator which processes memory blocks of predetermined size, for example 64 Kb. Large objects are defined as being objects having a size of between 256 and 64 Kb. For such objects, 64 Kb memory block is considered to be a memory region ("chunk") able to accommodate several large objects of different sizes. When an object is no longer used by the process, the space freed can be returned to the operating system. Before this, this free space is merged with adjacent free spaces. To search for adjacent free spaces, the Bruijn sequence algorithm is used, applied to the bit field disposed in each predetermined memory region.

11 Claims, 7 Drawing Sheets

MEMORY MANAGEMENT SYSTEM FOR REDUCING MEMORY FRAGMENTATION

BACKGROUND

The present invention relates to a memory management system for a process formulated in the C/C++ language in a processing unit. It has a particularly useful application in long-running IT programs or applications such as server applications. These applications must keep the usage of their memory stable over time.

In general, there are two types of memory usage:
the quantity of memory which the process actually uses, called "heap usage", which must be stable, otherwise the process risks encountering memory problems
the quantity of memory which the operating system reserves for the process, called "virtual memory usage". It comprises the heap usage as well as libraries and the code of the application.

Memory fragmentation is the difference between virtual memory usage and heap usage. It is the memory which the system reserves, and contains nothing useful for the process. It cannot be zero, but must be kept as low as possible. If memory fragmentation continues to increase, serious problems can occur:
as the virtual memory increases, this puts more pressure on the operating system, and degrades performance as a whole, sometimes by a very significant factor;
for 32-bit applications, the quantity of available virtual memory is limited to 4 gigabytes or less, depending on what platform is used. Such an application would then lack virtual memory and be interrupted.

Some programming languages such as Java or NET solve the problem of memory fragmentation by moving objects in memory, i.e. they can "compact" the heap.

This solution is impossible with C or C++ applications, where objects have a fixed address in memory until they are freed.

In particular, existing C/C++ allocators have one or more of the following weaknesses:
the default memory allocator cannot implement internal fragmentation correctly, because of an inadequate block coalescing algorithm. If the size classes which the allocator controls do not suit the sizes which the process uses, this will increase internal fragmentation.
external fragmentation can also not be implemented correctly using a weak coalescing algorithm. Coalescing free blocks is generally very resource-intensive, but it is an obligatory stage for limiting external fragmentation.

One of the technical problems is therefore the fact that fragmentation consumes time and resources, which in the end penalizes other applications of the system.

SUMMARY

The purpose of the present invention is to remedy the above-mentioned drawbacks, by proposing a new, low fragmentation memory allocator for C/C++. The purpose of the invention is therefore to replace the default memory allocator which is supplied with the operating system, and to avoid external fragmentation. Another purpose of the invention is to keep virtual memory as low as possible.

At least one of the above-mentioned objectives is achieved with a memory management system for a process formulated in the C/C++ language in a processing unit, this system comprising:

an allocator, which is capable of allocating memory spaces for the objects which the process uses, and of freeing memory spaces which the process does not use to the operating system of the processing unit;
an asynchronous mechanism, which is capable of defining a buffer zone consisting of a set of memory blocks which are available for the process, all the memory blocks of said mechanism being of the same size, equal to $m*32$ kilobytes, where m is comprised between 1 and 4;
each memory block of $m*32$ kilobytes, originated from said mechanism and used by the process, is managed by the allocator in the form of memory regions, according to the "chunk" memory management technique; for large objects, the size of which is within a predetermined size range, each memory block of $m*32$ kilobytes is considered as a multi-size chunk which includes several of said large objects of different sizes, said multi-size chunk containing a header indicating that this is a chunk comprising large objects, a bit field, and a data area comprising small memory blocks in the course of usage and free small memory blocks, the small memory blocks of the multi-size chunk being all of the same size; the allocator comprising means of implementing the de Bruijn algorithm, in combination with the bit field technique, to determine the adjacent free blocks, when the process frees a small memory block.

More precisely, when the process frees a small memory block, the allocator investigates whether adjacent free small blocks exist, to coalesce them and thus to form a larger block to be freed. The de Bruijn algorithm, which can be found in the document "Using de Bruijn Sequences to Index a 1 in a Computer Word", Charles E. Leiserson, Harald Prokop, Keith H. Randall, MIT Laboratory for Computer Science, Cambridge, Mass. 02139 USA, Jul. 7, 1998, is used in the search for adjacent free blocks, in combination with the bit field. This technique makes it possible to speed up the search, and thus to free memory quickly to the operating system while limiting fragmentation.

This invention provides a technical answer to a technical problem.

Said large objects are of a size less than $m*32$ kilobytes.

With the system according to the invention, the allocator reserves only small ranges of memory, and these ranges are returned to the system when they become empty. The virtual memory of the process is thus kept as small as possible. In contrast, in the systems of the prior art, the allocators reserve an extended range of address space, and control their memory blocks within this range. According to the prior art, this range of address space ("heap") expands if necessary; the disadvantage being the fact that the memory is never returned to the system, and thus the virtual memory usage of the process can increase, which increases the pressure on the memory on the system side.

In the system according to this invention, the asynchronous mechanism, called "free store", forms a buffer area in which a set of memory blocks is kept available to the allocator. The number of these blocks varies between a minimum and a maximum value. More precisely, the asynchronous mechanism comprises means for reserving a memory block of $m*32$ kilobytes when a minimum threshold of the number of memory blocks is passed, and means for freeing memory blocks of $m*32$ kilobytes to the operating system when a maximum threshold of the number of memory blocks is overshot.

In particular, the present invention is remarkable for the fact that the asynchronous mechanism reserves memory by memory block of $m*32$ kilobytes, where m can advantageously equal 2. Memory is allocated to the process by memory block of 64 kilobytes. Thus, for instance, working with memory blocks of 64 kilobytes, little virtual memory is used and the allocator can manage these memory blocks more rapidly. The memory block size can be parameterized as a function of the constraints of the operating system and the type of application. For instance, 128 kilobytes can be used instead of 64 kilobytes for a 64-bit application.

Preferably, the size of each small memory block is 8 bytes. When the size of an object is not a multiple of 8 bytes, the size of the object is rounded up to the immediately greater multiple of 8 bytes.

According to an advantageous characteristic of the invention, each small memory block in the course of usage by the process contains an area which includes the object in the course of usage and a header indicating the size of said object in the course of usage.

Additionally, each free small memory block can contain a link to the preceding free small memory block, a link to the following small memory block, and a free memory space for data.

The system according to the invention also comprises a list, termed the free list of large objects, in which are listed, for each size of said predetermined range of sizes, links to free small memory blocks in the multi-size chunks.

According to an advantageous characteristic of the invention, said predetermined range of sizes consists of a range such that 256 bytes<object size $\leq m*32$ kilobytes. The objects for which the size obeys this formula are called large objects.

Additionally, small objects can be defined as objects for which the size is less than or equal to 256 bytes. The limit of 256 bytes for small objects can be adjusted depending on the size of objects which the process manipulates. For such objects, each memory block of m*32 kilobytes which must be used is subdivided into multiple page chunks or regions; each page chunk contains a header which includes the size of the objects and an indication of the character, empty or not, of the page chunk, and multiple small memory blocks of the same size, each small memory block being free or filled with an object. Advantageously, the system also comprises a first free list of small objects associated with the set of page chunks, such that for each object size, links to free small memory blocks are established. The system also comprises, for each page chunk, a second internal free list of small objects, this internal free list comprising links between objects and free small memory blocks within the same page chunk; said first and second free lists of small objects are managed by the allocator for allocating and freeing memory. Management of small objects therefore does not necessitate the technique of searching free adjacent blocks. The two thus defined lists make it possible to set up chaining between memory blocks.

Advantageously, to free an object, the allocator comprises means for implementing the operation of "addressing the object to be freed" modulo "m*32 kilobytes", in such a way as to deduce from it the size of said object to be freed.

According to the invention, the allocator comprises means for freeing a memory block of m*32 kilobytes to the operating system when the set of page chunks of this memory block are empty.

In particular, in addition to the above, for huge objects of sizes greater than m*32 kilobytes, the allocator comprises means of fetching from the asynchronous mechanism several memory blocks of m*32 kilobytes, each of a kind to form an oversized chunk, and each oversized chunk containing a header which signals that this is a chunk which contains a huge object.

BRIEF DESCRIPTION OF THE DRAWINGS

Other advantages and characteristics of the invention will become apparent on examination of the detailed description of an embodiment which is in no way limitative, and the attached drawings, in which.

DETAILED DESCRIPTION

Although the invention is not limited in this way, a system according to this invention for an allocator of 32-bit type will now be described. The person skilled in the art will understand that it is easy to extend this solution to an application of 64-bit type, in particular by adjusting m in the block size m*32 kilobytes.

Figure 1:
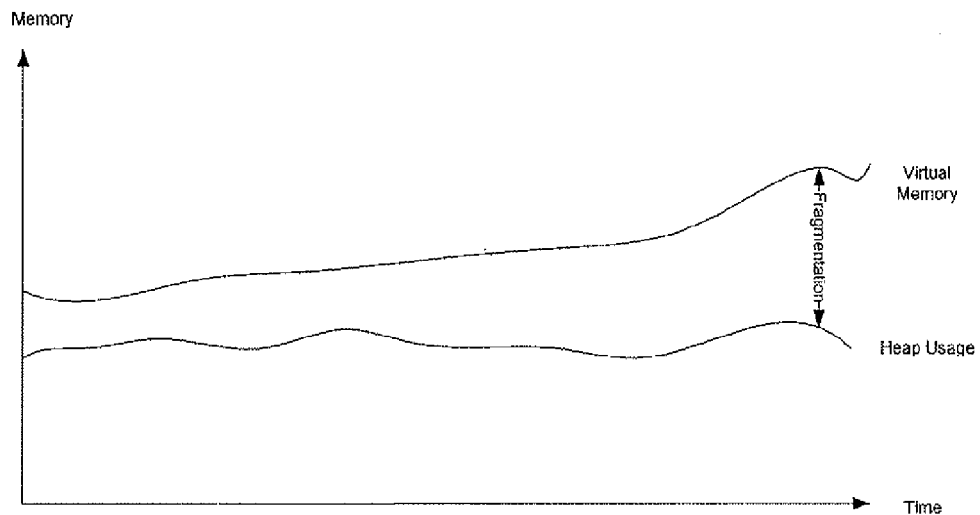
FIG. 1 is a schematic view of the development of the memory of a process over time.
Figure 2:
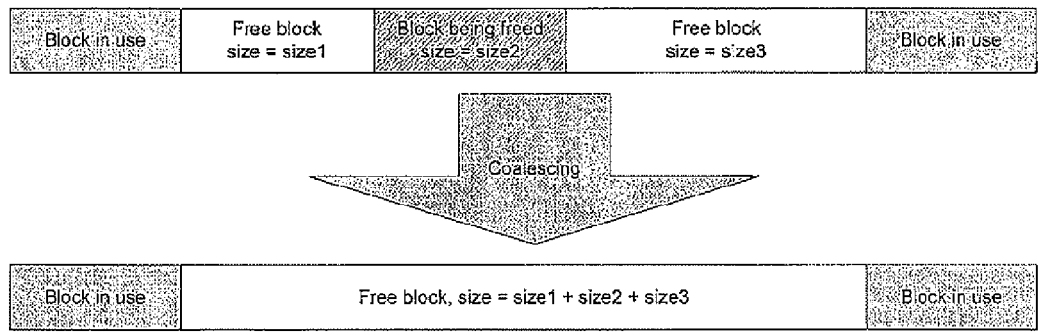
FIG. 2 is a schematic view of the principle of coalescing free memory blocks.

In FIG. 1, a graph containing two curves is shown. The lower curve represents the heap usage, and the upper curve represents the virtual memory. The gap between the two curves is the fragmentation. One way of limiting the fragmentation is to implement coalescing. As can be seen in FIG. 2, this involves grouping a memory block which has just been freed with adjacent free memory blocks.

The allocator according to the invention distinguishes three types of object: large objects, small objects and huge objects.

In order to avoid fragmentation of address space, an important factor in a process of 32-bit type, where available address space is rare, memory buffers of fixed size are used (size set to 64 kilobytes). To allocate huge objects, larger memory buffers are allocated (size fixed at n×64 kilobytes).

These memory buffers are allocated using low level primitives of the operating system, and must be allocated at addresses which are multiples of 64 kilobytes, Object Sizes.

The C standard requires that the address of an object should be aligned on the boundary of a word of 8 bytes. This means that the allocator can round the size of the object up to the next 8 bytes, thus reducing the number of "size classes" to be managed.

The allocator according to the invention defines three types of object, according to the following sizes:

small objects: size≦256 bytes large objects: size>256 bytes and size≦limit (the limit approximately equals 63 kilobytes)

huge objects: size>limit.

Figure 3:
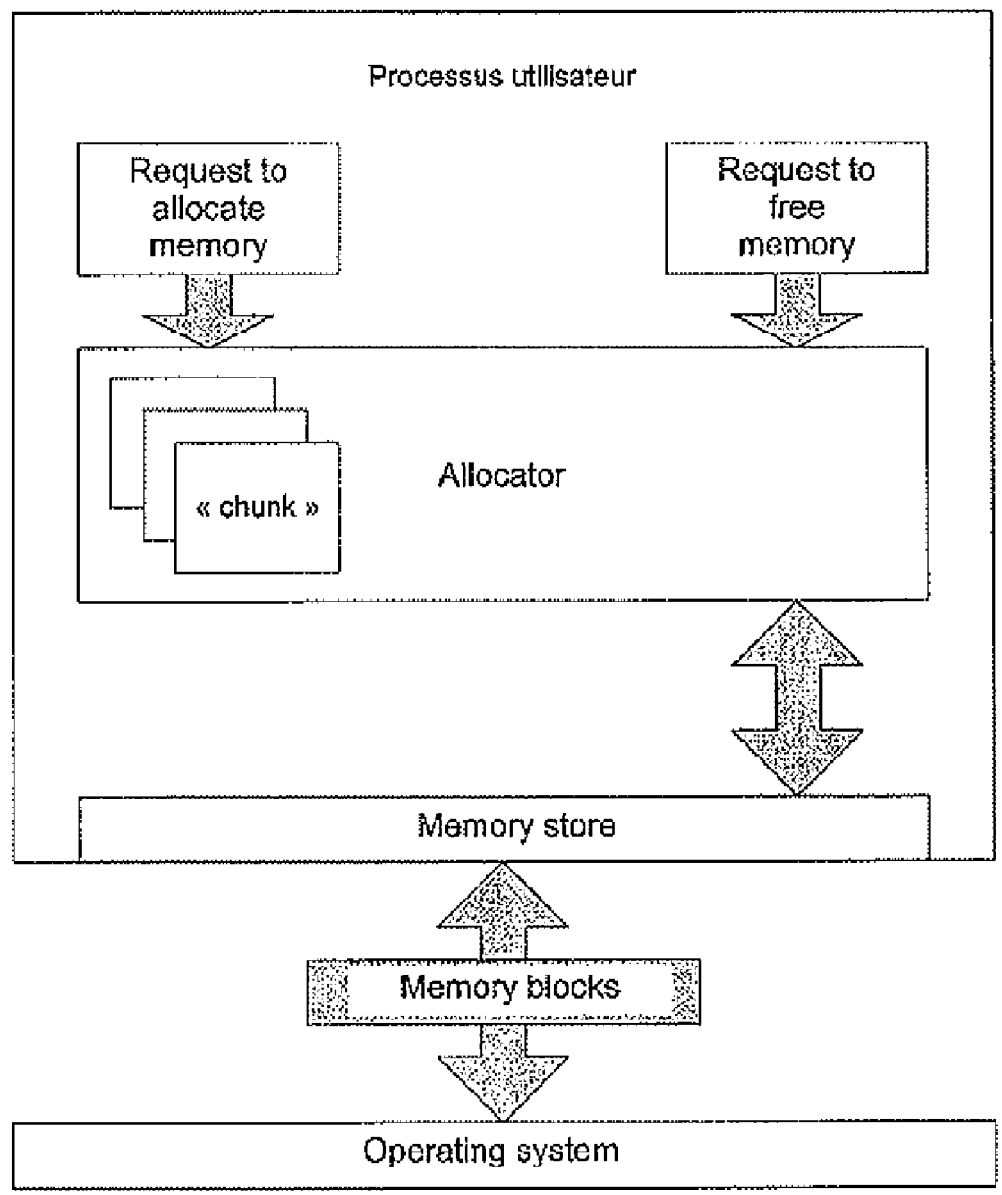
FIG. 3 is a general schematic view of the implemented application components.

In FIG. 3, how various application programs of the system interface with each other is shown schematically. The asynchronous mechanism is a buffer area which supplies memory blocks, which are managed by the allocator. The latter receives instructions from the operating system and the process, for allocating or freeing memory blocks.

The Functions of the Allocator.

The allocator supplies an interface, which comprises two functions:

allocating an object: the allocator receives the size of the object, and must return the address of the object. It rounds the size of the object up to the next 8 bytes. It then determines whether the object is small, large or huge, and manages the object accordingly.

freeing an object: the allocator receives the address of the object. To obtain the size of the object from the address of the object, the allocator rounds the address of the object down to the boundary of the preceding 64 kilobyte memory, and reads the value which is stored at this rounded address. This value is an indicator of the size of the object, if the value is zero, it is a large object, if the value≦256, it is a small object, otherwise, it is a huge object.

The allocator makes it possible to return the unused memory to the operating system as much as possible, and to merge the free blocks very efficiently, using the bit field technique and the de Bruijn algorithm.

The functions of the Asynchronous Mechanism (free store).

The free store is an asynchronous mechanism (which functions according to its own routines) which carries out the low level management of memory using the primitives of the operating system. It continuously maintains a list of 64 kilobyte memory buffers (more than the minimum size of the free store), so that the requirements of the allocator can be met immediately when new page chunks (fixed memory regions) or a new chunk (fixed region) for large objects must be allocated. Reciprocally, it delays the destruction of the 64 kilobyte memory buffers and the freeing of empty page chunks until the maximum size of the free store is reached. In this way, low level memory operations have a minimum impact on the performance of the allocator.

The routines of the free store wait for a semaphore which the allocator must signal to clean the memory buffers when the size of the free store is above the maximum size, and to preallocate 64 kilobyte memory buffers when the size of the free store is less than the minimum size.

Oversized memory buffers are allocated each time this is necessary, and are destroyed when they are freed.

Memory buffers containing page chunks (for small objects) are destroyed only when all the page chunks are unlinked from the memory and when the head page chunk is empty.

The management of small objects will now be described.

Regarding the Structure.

Figure 4:
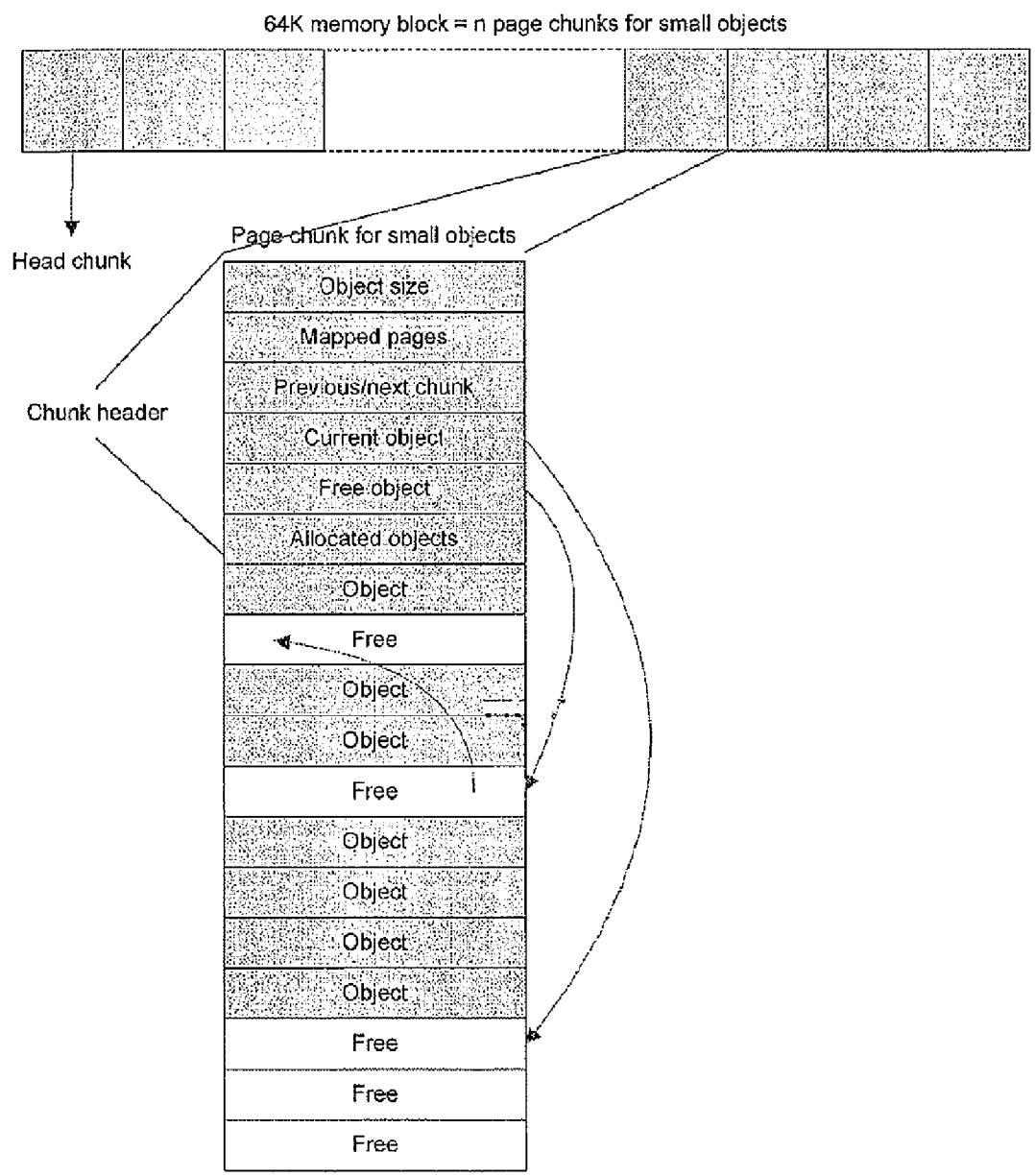
FIG. 4 is a schematic view of a 64 kilobyte memory block which includes multiple page chunks for small objects.

For small objects, the memory load must be limited as far as possible. To do this, the page chunk technique is used to store small objects of the same size class. A page chunk is a memory area which comprises a header and a data part. For small objects, the free store makes a 64 kilobyte memory block available to the allocator. This memory block is partitioned into multiple page chunks, as can be seen in FIG. 4. Depending on what platform (operating system) is used, a page chunk can be of 4 kilobyte or 8 kilobyte size, so that there will be 16 or 8 page chunks in a 64 kilobyte memory block. The first page chunk of the memory block is a global header ("head chunk"), which contains an indicator which enables the allocator to detect whether this is a memory block for small objects. As is shown in FIG. 4, each page chunk contains an internal header ("chunk header"), in which are data concerning:

the size of the objects which are present in the page chunk, page addressing ("mapped pages"), the preceding and following page chunks, the current object, the free object, and the allocated objects.

The remaining part of the page chunk is a part of the data which comprises several small memory blocks of the same size. Each small memory block is free or includes an object.

Regarding the Allocation of a Small Object.

Figure 5:
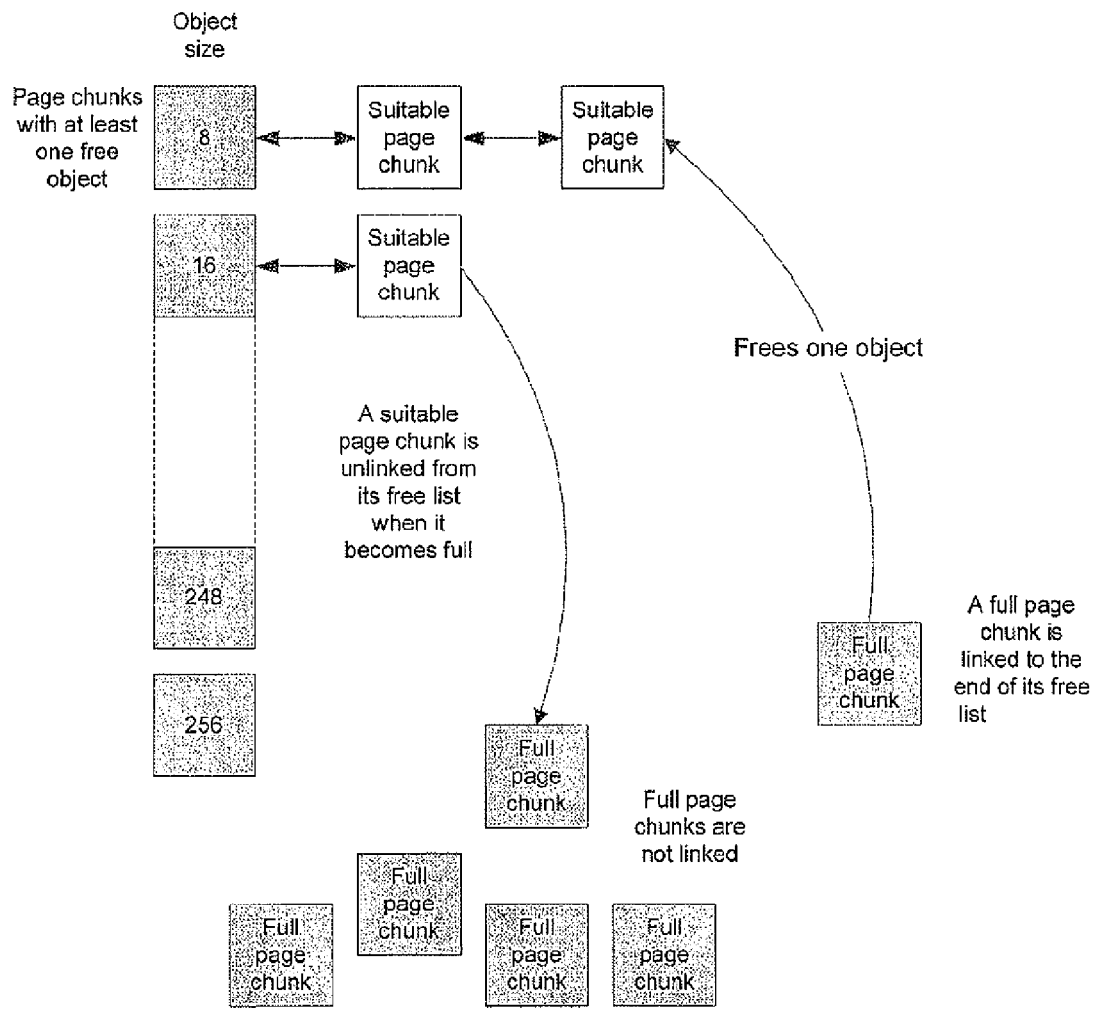
FIG. 5 is a schematic view of an external free list for small objects.

The allocator contains an external free list for small objects. This external free list is shown in FIG. 5. This list contains, for each size type (within the limit of the definition of small size, i.e. <256 bytes), a link which is set up to a first available page chunk, which also contains a link to a possible second available page chunk, and so on. Each page chunk can therefore be doubly linked. The first page chunk i can therefore be the first element of a list of available page chunks for the same size class i×8.

Each page chunk also comprises an internal free list concerning the links between objects and free small memory blocks.

If the external free list is not empty, the allocator uses the pointer to the current object in the first page chunk to obtain a free object. The number of objects is incremented, and the pointer to the current object is incremented. If this was the last free object of the page chunk, the link to this page chunk is destroyed. If the external free list is empty, a new page chunk is withdrawn from the free store for allocating the object. The page chunk is then put into the external free list.

Regarding the Freeing of an Object.

Given the address of an object, the allocator calculates the start address of the relevant memory block by: object address modulo 64 kilobytes (since the memory blocks are aligned on 64 kilobyte memory boundaries). The value at this address, in the case of a small object, is less than 256, since it is the address of the head chunk, and the first attribute which is stored in a page chunk is an object size, and is less than 256. The allocator calculates the address of the page chunk which contains the freed object: object address modulo size of page chunk. The object size is obtained from the header of the page chunk, The freed object is then linked to the internal free list of the page chunk, and the number of objects is decremented. If the page chunk becomes empty, it is unlinked from the external free list of small objects and returns to the free store. The free store uses a specific attribute in the page chunk (page addressing, FIG. 4) to determine whether all the page chunks in the 64 kilobyte memory block are empty or unaddressed. In which case, the whole memory block can be returned to the operating system.

The management of large objects will now be described.

Regarding the Structure.

For large objects, a single memory region of fixed size, called a chunk, is used. In other words, each 64 kilobyte memory block from the free store is transformed into a single chunk. This chunk can contain large objects of different size classes. A mechanism for coalescing small memory blocks is therefore required. According to the present invention, the coalescing algorithm is not based on links which are set up between the lists, or binary trees, as in the prior art, but on the bit field.

Each chunk for large objects contains a bit field. Each bit in this field gives the state of an 8-byte memory block: 0 if free, 1 if used. This makes efficient, rapid coalescing possible, without scanning lists as in the prior art.

Figure 6:
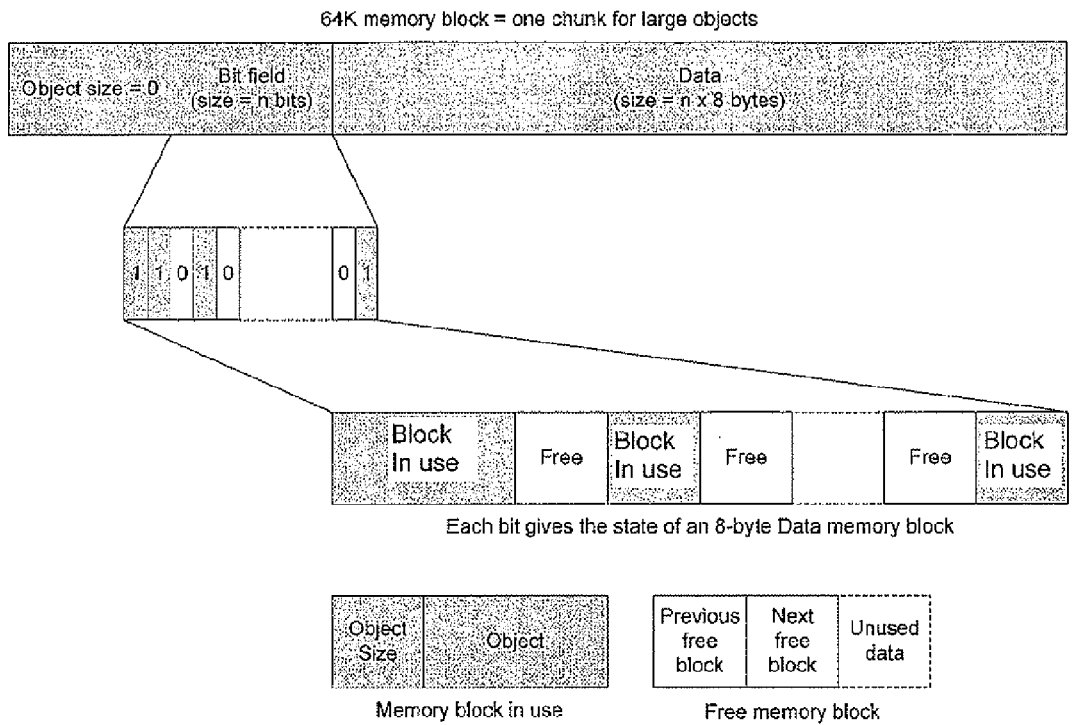
FIG. 6 is a schematic view of a 64 kilobyte memory block in the form of a single chunk (or memory region of fixed size) for large objects of different sizes.

In FIG. 6, the structure of a 64 kilobyte chunk is shown. Since a chunk for large objects mixes different size classes, the object size is stored in the header of each allocated large object. Each small memory block in the course of usage contains a header and a data part, which includes the object in the course of usage. Each free small memory block contains a link to a preceding free block and a link to a following free block, and an unused (free) data part.

Regarding the Object Allocation.

Since large objects require a header to store their size, the size of the header is added to the size of the object, and the size of the object is rounded up to the boundary of the next 8-byte block. A better correspondence search is carried out on an external free list, which lists, for each size, a possible link to an available memory block of the same size. The search starts from the size of the object:

in the case of exact correspondence, the free block is unlinked from the free list and used to allocate the object, if a larger free block is found, this free block is unlinked and split. The remainder is linked to the corresponding free list, if no free block of greater size is available, a new chunk is created for large objects, by requesting a 64 kilobyte memory buffer from the free store. This new chunk contains a single large free block, and the bit field is filled with zeros. This large free block is split (unless the object size is exactly (n−1)×8 bytes), and the remainder is linked to the corresponding free list.

When a memory block has been found, the corresponding bits in the bit field are all set to 1.

Figure 7:
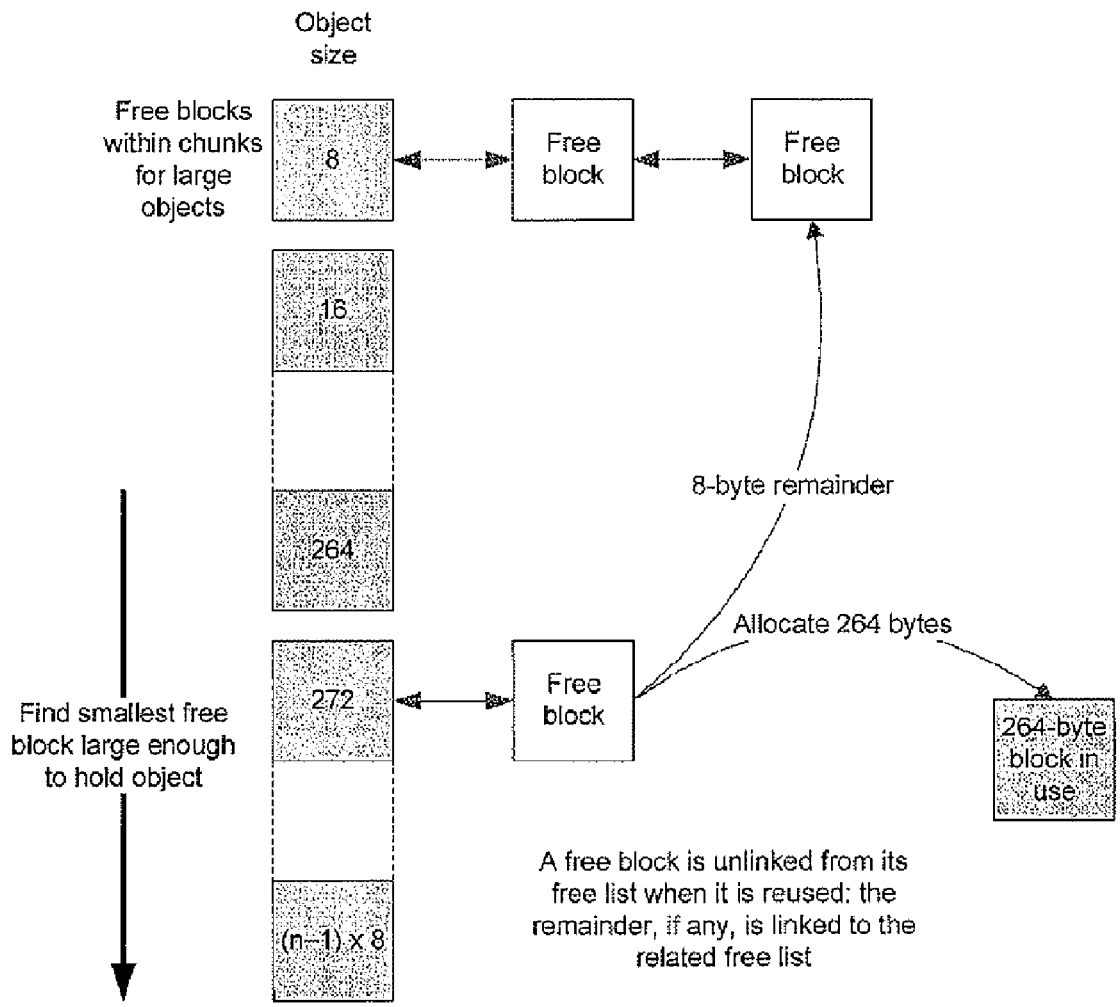
FIG. 7 is a schematic view of a free list for large objects.

In FIG. 7, an example of allocation of a 264-byte object is shown. For the size of 264 bytes, the free list comprises no free block. As the next best, the immediately greater size of 272 bytes is used. There, a free block is available. This free block is therefore used, and the 8 remaining bytes constitute a free block which is linked to the sequence of free blocks of the same size.

Regarding Freeing.

When the allocator frees a large object, it first obtains the size of the object from the header of the object, and then coalesces this new free block with the adjacent free blocks. It uses the bit field to identify these adjacent free blocks. To do this, the previous or following "1" bit is searched for in the bit field, jumping over zero words. One iteration moves the cursor forwards or backwards 32×8=256 bytes in memory. When a non-zero word is found, the problem consists of finding the first (or last) "1" bit in this word. To do this, an efficient, transferable method is advantageously used; this method uses the de Bruijn sequences to index a "1" in an IT word.

Figure 8:
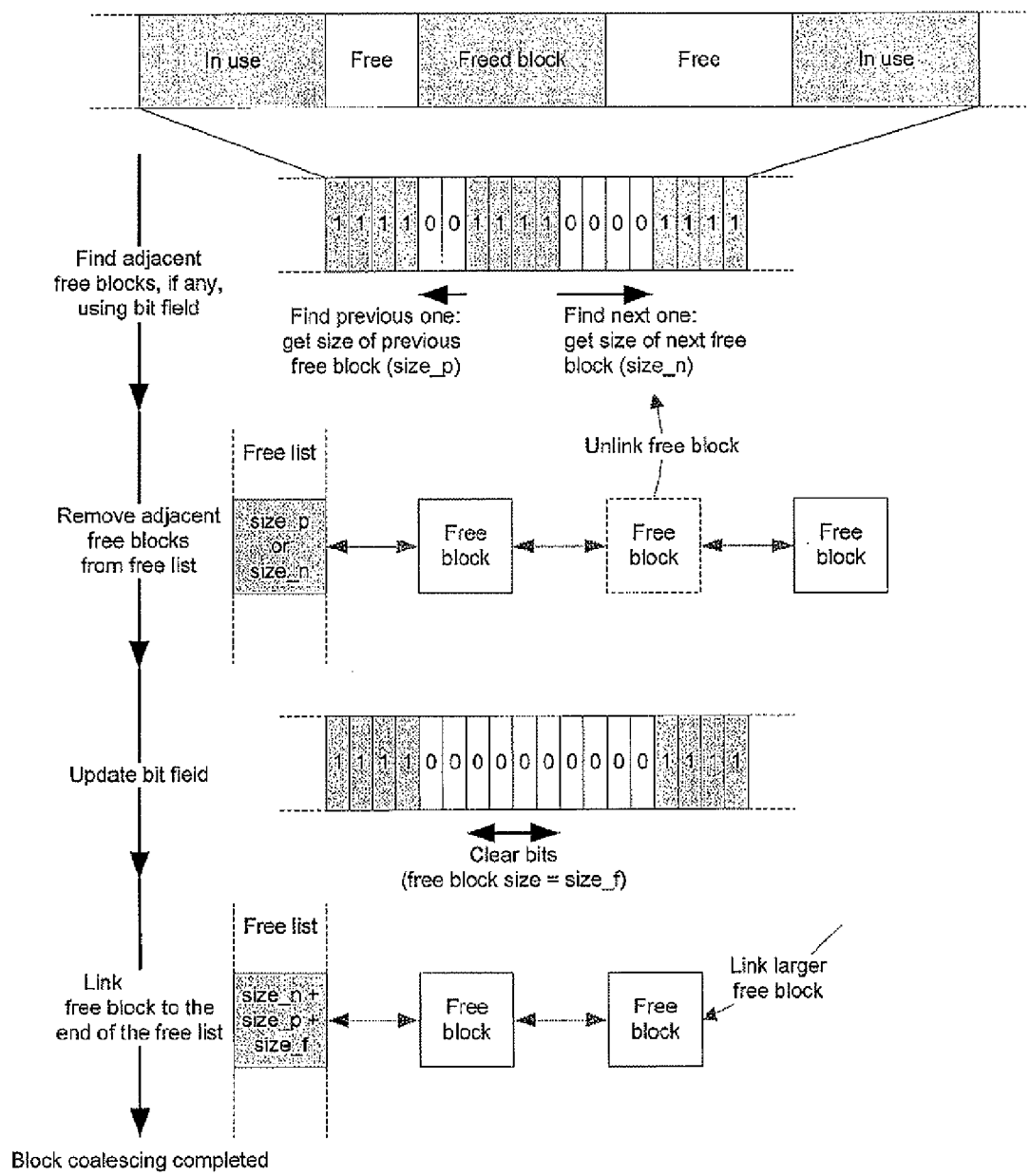
FIG. 8 is a schematic view of a method of coalescing free memory blocks according to the invention.

In FIG. 8, a method of coalescing free memory blocks is shown. The freed memory block is surrounded by two free blocks. The bit field is run through to find the adjacent free blocks. These free blocks are removed from the free list. The bit field is updated, and then the new memory block formed by coalescing or merging the three free blocks is linked to the end of the free list.

In fact, the allocator contains two free lists or vectors of memory block chained lists: one for small objects (list of page chunks), and one for large objects (list of free memory locations for each size of object). These vectors are initialized statically, at the start of the process which uses the allocator. Advantageously, the lists (one for each element of the vector) are chained in both directions, to allow a chunk to be deleted without running through the whole list.

The management of huge objects will now be described.

Regarding the Structure.

Figure 9:
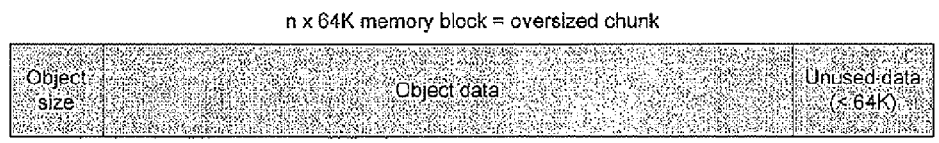
FIG. 9 is a schematic view of an oversized memory block for huge objects.

A huge object is allocated from an oversized chunk, which is constructed using an oversized memory block, i.e. a memory block of size greater than 64 kilobytes. There is one oversized chunk for each huge object. In FIG. 9, such a chunk is shown with a header which includes the size of the object, a data part which includes the object and an unused data part at the end of the oversized chunk.

Regarding the Object Allocation.

For a huge object, the allocator requests an oversized memory block from the free store. Such memory blocks are not preassigned.

Regarding the Freeing of the Object.

When the allocator frees a huge object, the oversized memory block is freed, and the free store is informed so that the memory returns to the operating system as soon as possible.

This invention therefore relates to a memory management system for a process formulated in the C/C++ language in a processing unit. This system comprises an allocator, which processes memory blocks of a predetermined size, e.g. 64 kilobytes. Large objects are defined as objects of a size between 256 bytes and 64 kilobytes. For such objects, each 64 kilobyte memory block is considered as a memory region which is suitable for collecting multiple large objects of different sizes. When an object is no longer used by the process, the freed space is liable to be returned to the operating system. Before that, this free space is merged with adjacent free spaces. To search for adjacent free spaces, the de Bruijn sequence algorithm is used, and applied to the bit field which is arranged in each predetermined memory region.

Of course, the invention is not limited to the examples which have just been described, and numerous adjustments can be made to these examples without exceeding the scope of the invention.

The invention claimed is:

1. A memory management system for a process formulated in the C/C++ language in a processing unit, this system comprising:

an allocator, allocates memory spaces for the objects which the process uses, and of freeing memory spaces which the process does not use to the operating system of the processing unit;

an asynchronous mechanism, which defines a buffer zone consisting of a set of memory blocks which are available for the process, all the memory blocks of said mechanism being of the same size, equal to m*32 kilobytes, where m is between 1 and 4;

each memory block of m*32 kilobytes, originated from said mechanism and used by the process, is managed by the allocator in the form of memory regions, according to the "chunk" memory management technique; for large objects, the size of which is within a predetermined size range, which consists of a range such that 256 bytes<object size≦m*32 kilobytes, each memory block of m*32 kilobytes is considered as a multi-size memory region (chunk), which includes several of said large objects of different sizes, said multi-size memory region (chunk) containing a header indicating that this is a memory region (chunk) including large objects, a bit field, and a data area comprising small memory blocks in the course of usage and free small memory blocks, the small memory blocks of the multi-size memory region (chunk) being all of the same size and in that for small objects of which the size is less than or equal to 256 bytes, each memory block of m*32 kilobytes which must be used is subdivided into multiple fixed memory segments termed "page chunks"; each fixed memory segment (page chunk) contains a header which includes the size of the objects and an indication of the character, empty or not, of the fixed memory segment (page chunk), and multiple small memory blocks of the same size, each small memory block being free or filled with an object; the allocator comprising means of implementing the de Bruijn algorithm, in combination with the bit field technique, to determine the adjacent free blocks, when the process frees a small memory block.

2. The system according to claim 1, characterized in that the asynchronous mechanism comprises means for reserving a memory block of m*32 kilobytes when a minimum threshold of the number of memory blocks is passed, and means for freeing memory blocks of m*32 kilobytes to the operating system when a maximum threshold of the number of memory blocks is overshot.

3. The system according to claim 1, characterized in that m equals 2.

4. The system according to claim 1, characterized in that the size of each small memory block is 8 bytes.

5. The system according to claim 1, characterized in that each small memory block in the course of usage by the process contains an area which includes one of said objects in the course of usage and a header indicating the size of said object in the course of usage.

6. The system according to claim 1, characterized in that each free small memory block contains a link to a preceding free small memory block, a link to a following small memory block, and a free memory space for data.

7. The system according to claim 1, characterized in that it also comprises a list, called the free list of large objects, in which are listed, for each size of said predetermined range of sizes, links to free small memory blocks in the multi-size memory regions (chunks).

8. The system according to claim 1, characterized in that it also comprises a first free list of small objects associated with the set of fixed memory segments (page chunks), such that for each object size, links to free small memory blocks are established, and in that it also comprises, for each fixed memory segment (page chunk), a second internal free list of small objects, this internal free list comprising links between objects and free small memory blocks within the same fixed memory segment (page chunk); said first and second free lists of small objects are managed by the allocator for allocating and freeing memory.

9. The system according to claim 1, characterized in that to free an object, the allocator comprises means for implementing the operation of addressing the object to be freed modulo m*32 kilobytes, in such a way as to deduce from it the size of said object to be freed.

10. The system according to claim 1, characterized in that the allocator comprises means for freeing a memory block of m*32 kilobytes to the operating system when the set of fixed memory segments (page chunks) of this memory block are empty.

11. The system according to claim 1, characterized in that for huge objects of sizes greater than m*32 kilobytes, the allocator comprises means of fetching from the asynchronous mechanism several memory blocks of m*32 kilobytes, each of a kind to form an oversized memory region (chunk), and each oversized memory region (chunk) containing a header which signals that this is a chunk which contains a huge object.

* * * * *